United States Patent
Lee

(10) Patent No.: US 6,574,751 B1
(45) Date of Patent: Jun. 3, 2003

(54) HARD DISK DRIVER STATE DETECTION METHOD

(75) Inventor: Chun-Liang Lee, Taipei (TW)

(73) Assignee: Inventec Corp., Taipei (TW)

( * ) Notice: Subject to any disclaimer, the term of this patent is extended or adjusted under 35 U.S.C. 154(b) by 0 days.

(21) Appl. No.: 09/520,953

(22) Filed: Mar. 8, 2000

(51) Int. Cl.⁷ .............................. H02H 3/05
(52) U.S. Cl. .......................... 714/21; 714/42
(58) Field of Search ............................. 714/21, 15, 22, 714/23, 5, 718, 733, 734, 42; 710/15, 62, 301, 302; 360/2, 31

(56) References Cited

U.S. PATENT DOCUMENTS

| | | | | |
|---|---|---|---|---|
| 5,291,584 A | * | 3/1994 | Challa et al. | 703/24 |
| 5,469,565 A | * | 11/1995 | Hibi | 714/2 |
| 5,535,400 A | * | 7/1996 | Belmont | 713/330 |
| 5,796,690 A | * | 8/1998 | Kanno | 369/124.07 |
| 5,892,958 A | * | 4/1999 | Nagashige et al. | 417/362 |
| 5,903,778 A | * | 5/1999 | Chang | 710/62 |

FOREIGN PATENT DOCUMENTS

TW 457475 A * 10/2001

* cited by examiner

*Primary Examiner*—Dieu-Minh Le
(74) *Attorney, Agent, or Firm*—Bacon & Thomas, PLLC

(57) ABSTRACT

A hard disk driver state detection method includes the step of connecting at least one hard disk to a respective SCA2 (single connector attach2) on a SCSI (small computer system interface) card, the step of connecting the SCSI card to a computer system detection main unit through a SCSI bus on the SCSI card, and the step of driving the computer system detection main unit to detect the at least one hard disk. In addition to the step of detecting the at least one hard disk, the detection method includes the step of reading signals from the at least one hard disk by using a 12C (inter-integrated circuit) circuit in the SCSI bus, the step of judging the state of the at least one hard disk subject to the nature of the signal received, and the step of turning on respective indicator lights on the SCSI card subject to the result of the judgement.

7 Claims, 4 Drawing Sheets

HARD DISK DRIVER STATE DETECTION METHOD

BACKGROUND OF THE INVENTION

The present invention relates to a hard disk driver state detection method, and more particularly to an efficient and economic method of detecting every state of a hard disk driver.

When a hard disk is installed in a computer system, the driver of the hard disk must be well detected. According to the most commonly used hard disk driver state detection method (SCSI accessed fault-tolerant enclosures), the hard disk is connected to a SCSI (small computer system interface) card, and four of the 68 pins of the SCSI card are used as fault bus. By means of scanning the signal on the fault bus, the hot swap operation of the hard disk driver is judged, and the install, active, or fault operation state of the hard disk driver is indicated. The installed hard disk can be operated normally only when fault detection is done. Because this method uses the signal from the assigned four pins of the SCSI card for state judgment, it cannot achieve a complete fault detection on all functions of the hard disk. Further, the hard disk driver, which is connected to the SCSI card for detection, must be equipped with a decoder to identify messages transmitted from the controller of the SCSI card. The installation of the decoder greatly increases the cost of the hard disk driver. Further, because the fault bus defined by the assigned four pins of the SCSI card simply detects part of the functions of the hard disk driver, it is unable to know data access of the SCSI card to the hard disk driver and the operation condition of the hard disk driver. Further, using the assigned four pins as a fault bus affects the quality of signal transmission of the SCSI bus. Because of the aforesaid reasons, a hard disk failure may occur after the computer system has been delivered to the distributor or consumer.

SUMMARY OF THE INVENTION

The present invention has been accomplished to provide a hard disk driver state detection method, which eliminates the aforesaid drawbacks. It is one object of the present invention to provide a hard disk driver state detection method, which greatly simplifies the detection procedure. It is another object of the present invention to provide a hard disk driver state detection method, which greatly reduces hard disk driver state detection cost. According to one aspect of the present invention, a computer system detection main unit is used to detect a number of hard disks being connected to a SCSI (small computer system interface) card. The computer system detection main unit reads signals from the hard disks by scanning an inter-integrated circuit of a SCSI bus of the SCSI card, and judges the state of the hard disks subject to the nature of signal received, and then turns on respective indicator lights on the SCSI card indicative of the state of the hard disks. This method eliminates the installation of a decoder in each hard disk. According to another aspect of the present invention, the processor of the SCSI card detects install and active states of the hard disks and data access mode of the SCSI card by scanning signals on three pins of a SCA2 (single connector attach2) connected to the SCSI card.

DETAILED DESCRIPTION OF THE PREFERRED EMBODIMENT

Figure 1A:
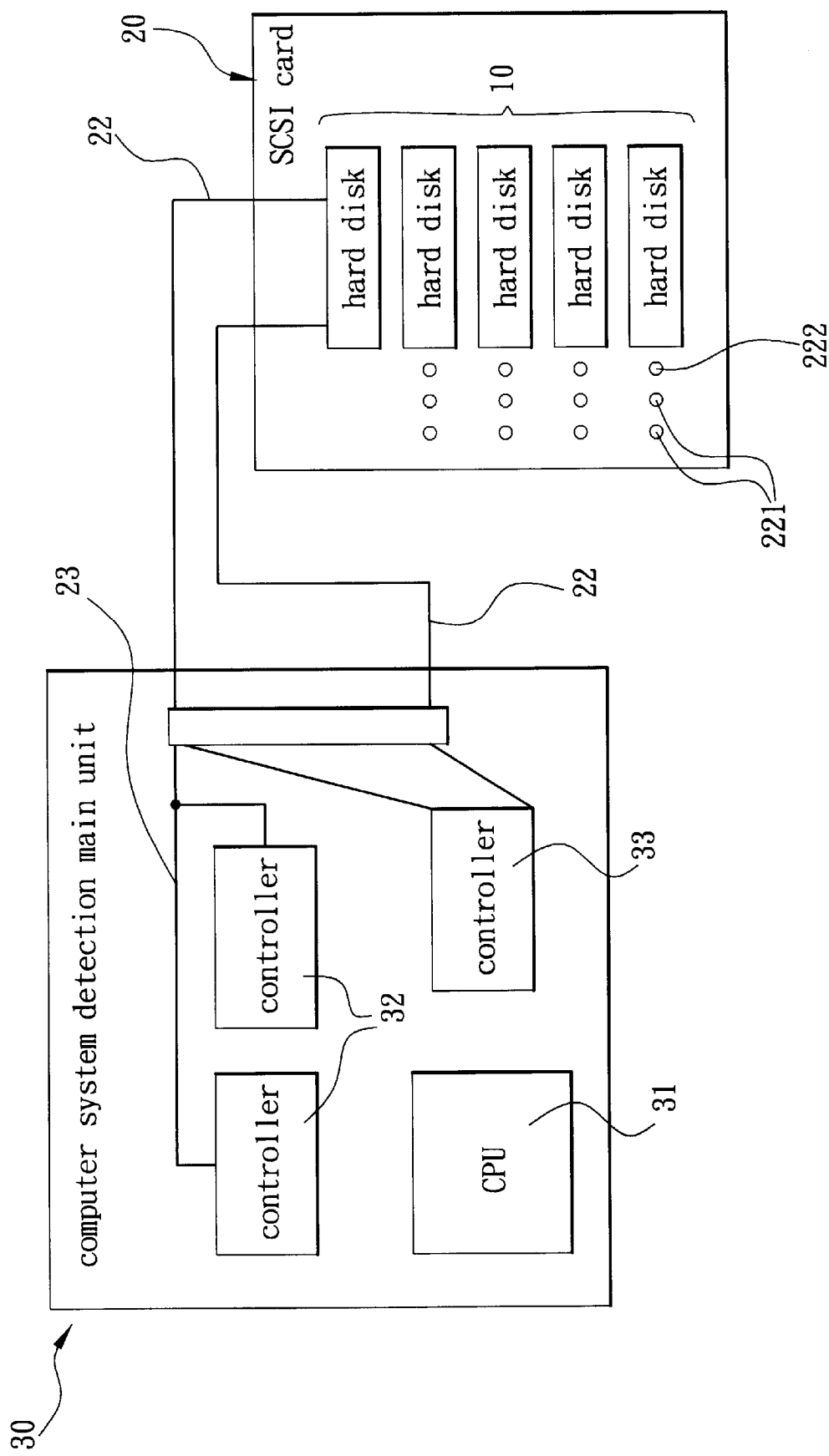
FIG. 1A is a front view showing the hardware architecture according to the present invention.
Figure 1B:
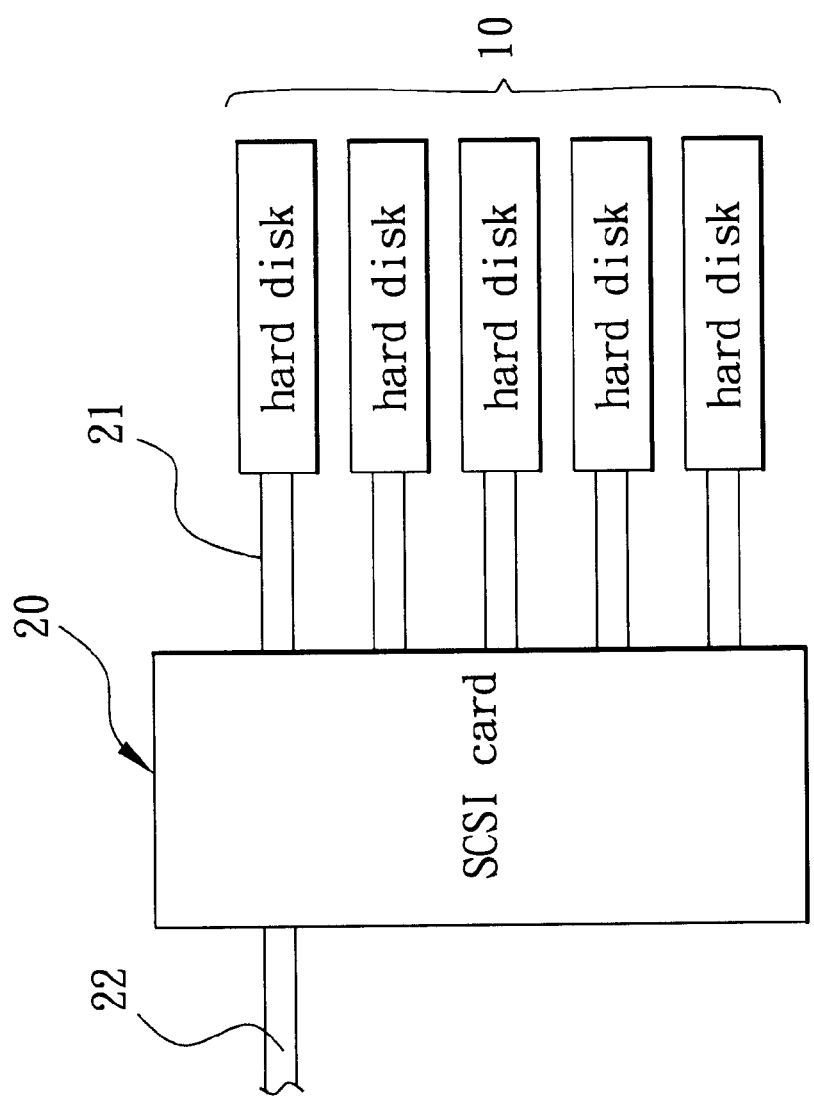
FIG. 1B is a side view of the hardware architecture according to the present invention.
Figure 2:
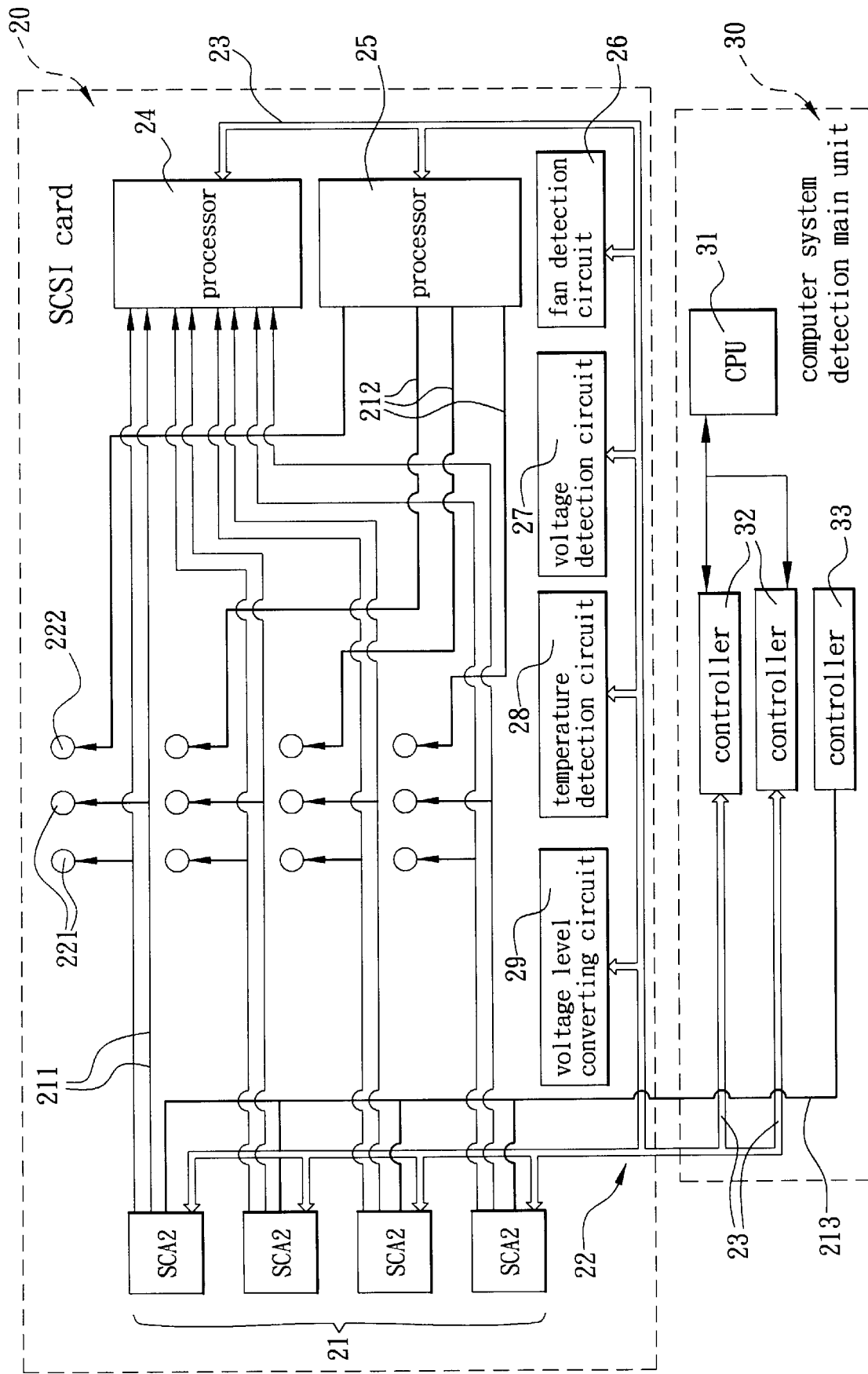
FIG. 2 illustrates the architecture of the system bus according to the present invention.

Referring to FIGS. 1A, 1B and 2, at least one hard disk 10 is respectively connected to a respective SCA2 (single connector attach2) 21 on a SCSI (small computer system interface) card 20, which is in turn connected to a computer system detection main unit 30 through a SCSI bus 22 thereof for state detection of a hard disk driver.

The SCA2 21 are respectively connected in parallel to a processor 24 on the SCSI card 20 by a respective pair of lines 211.

Indicator lights (LEDs) 221 are respectively installed in the lines 211 to indicate different states, for example, install and active states of the hard disks 10. The processor 24 is connected in series to one 12C circuit 23, for interconnecting integrated circuits, in the SCSI bus 22. The 12C circuit 23 is also connected in series to a second processor 25 on the SCSI card 20. The second processor 25 is connected to indicator lights (LED) 222 through lines 212, and controls the operation of the indicator lights 222 for fault state indication. The 12C circuit 23 is further connected in series to a fan detection circuit 26, a voltage detection circuit 27, a temperature detection circuit 28 and a voltage level converting circuit 29 on the SCSI card 20. The voltage level converting circuit 29 detects the operation mode of the hard disks 10, and is connected to the SCA2 21 through a line 213. By means of the fan detection circuit 26, the voltage detection circuit 27, the temperature detection circuit 28 and the voltage level converting circuit 29, the state of the fan, voltage, temperature and operation mode of the hard disks 10 are detected.

The computer system detection main unit 30 comprises a CPU (central processing unit) 31, and a plurality of controllers 32 and 33 respectively connected to the CPU 31. The controllers 32 of the computer system detection main unit 30 are respectively connected in series to the 12C circuit 23, forming a loop to receive state messages from the hard disks 10 through the SCSI card 20.

Figure 3:
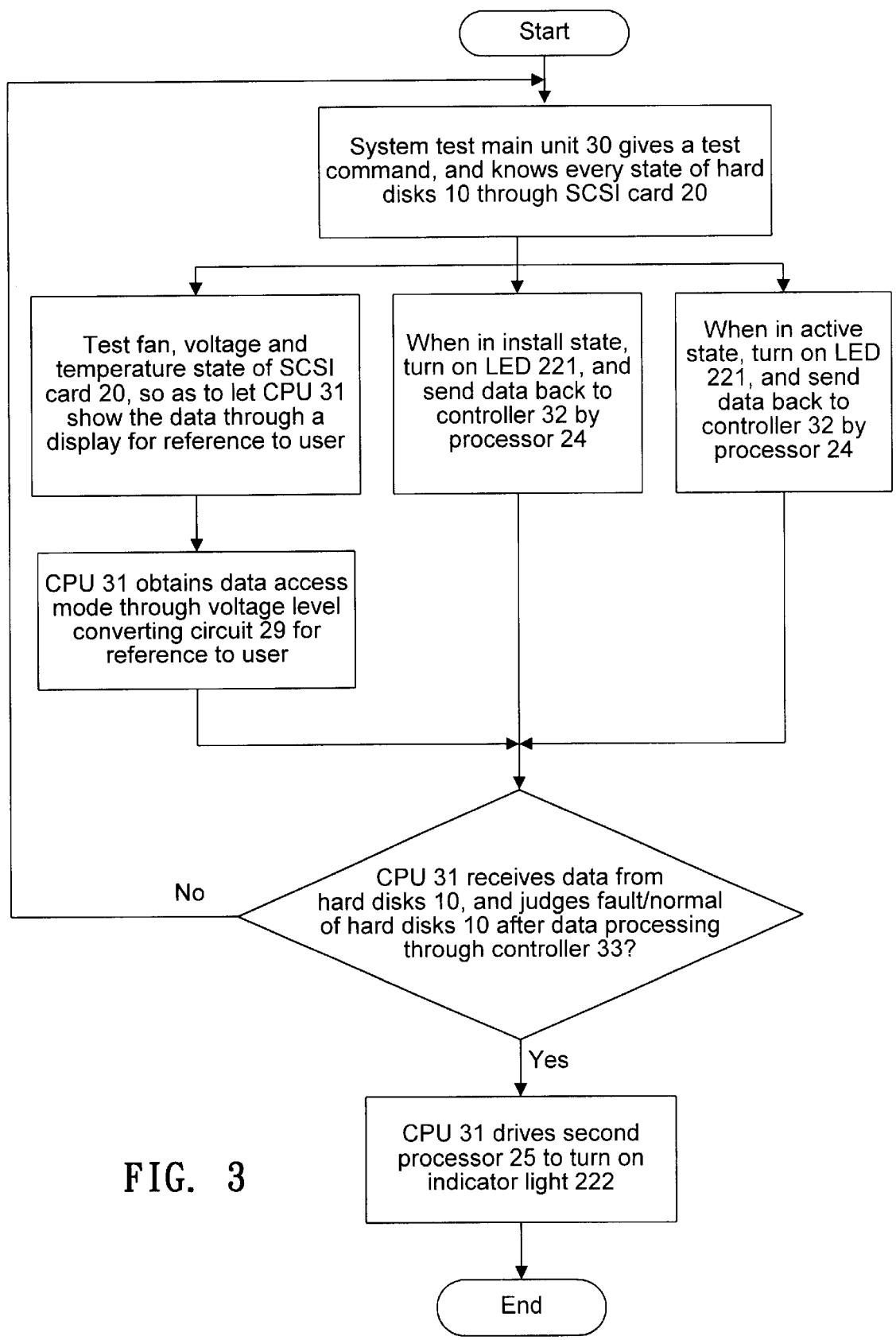
FIG. 3 is an operation flow chart of the present invention.

Referring to FIG. 3, every state of the hard disks 10 is detected subject to the following procedure.

At first, the computer system detection main unit 30 gives a detection command to the hard disks 10 through the SCSI card 20, and then the computer system detection main unit 30 and the SCSI card 20 proceed with the following procedure subject to the message obtained from the hard disks 10, so as to indicate the normal or fault state of the respective drivers of the hard disks 10:

(1) When the hard disks 10 are in the install state, the first processor 24 processes the data received by the SCSI card 20 through the lines 211, and then turns on the indicator lights (LED) 221 to indicate normal install of the hard disks 10 in the respective SCA2 on the SCSI card 20, and then sends the respective data back to the controllers 32;

(2) When the hard disks 10 are in active state, the first processor 24 processes the data received by the SCSI card 20 through the lines 211, and then turns on the indicator lights (LED) 221 to indicate normal access action of the hard disks 10, and then sends the respective data back to the controllers 32;

(3) When the SCSI card 20 receives data of the hard disks 10 from 12C 23 of SCSI bus 22 and the lines 213 of the SCA2 21, the fan detection circuit 26, the voltage detection circuit 27 and the temperature detection circuit 28 detect the state of the fan, voltage and temperature of the SCSI card 20, and the respective detection data thus obtained is sent by the respective controllers 32 to the CPU 31 for display through a monitor (not shown) for reference;

(4) When the CPU 31 receives different voltage level.data of the hard disks 10 from the voltage level converting circuit 29, the CPU 31 displays the voltage level data on the display, indicating the current data access mode (for example, high voltage data access mode, or low voltage data access mode) for reference.

The CPU 31 receives the data of the hard disks 10 through the 12C current 23 in the SCSI bus 22 of the SCSI card 20, and sends the data to one controller 33 for processing, and then judges the fault or normal state of the hard disks 10 subject to the processing result obtained from the controller 33. If the hard disks 10 are normal. The CPU keeps running the detection procedure. If it is detected that one hard disk 10 has failed, the CPU 31 immediately drives the controller 32 to give a control signal to the 12C 23, enabling the signal to be further sent to the second processor 25 for processing. After receipt of the control signal, the second processor 25 turns on the corresponding indicator light (LED) 222, indicating the fault state of the corresponding hard disk 10, and then the CPU 31 terminates the detection procedure.

As indicated above, the computer system detection main unit 30 scans the 12C circuit 23 in SCSI bus 22 of the SISC card 20 to read signals from the hard disks 10, so as to determine the state of the corresponding hard disk drivers, and to turn on the indicator lights 221 and 222 on the SCSI card 20 subject to a detection result. Because this method eliminates the installation of a decoder in each hard disk 10, the hard disk detection cost is greatly reduced, and the detection procedure is simplified.

It is to be understood that the drawings are designed for purposes of illustration only, and are not intended for use as a definition of the limits and scope of the invention disclosed.

What the invention claimed is:

1. A hard disk driver state detection method, comprising the steps of:

connecting at least one hard disk to a respective SCA2 (single connector attach2) on a SCSI (small computer system interface card);

connecting said SCSI card to a computer system detection main unit through a SCSI bus on said SCSI card;

driving said computer system detection main unit to detect said at least one hard disk;

reading signals from said at least one hard disk by means of a 12C (inter-integrated circuit) circuit in said SCSI bus on said SCSI card;

judging the state of said at least one hard disk subject to the nature of the signal received from each of said at least one hard disk; and turning on respective indicator lights on said SCSI card subject to the result of the judgement.

2. The hard disk drive state detection method of claim 1 wherein when said at least one hard disk in an install state, a message of the install state of said at least one hard disk is sent back to said SCSI card, and then processed by a first processor on said SCSI card, causing said first processor to turn on a corresponding indicator light on said SCSI card indicative of a data access state of said at least one hard disk.

3. The hard disk driver state detection method of claim 1 wherein when said at least one hard disk is in active state, the message of the active state of said at least one hard disk is sent back to said SCSI card, and then processed by a first processor on said SCSI card, causing said first processor to turn on a corresponding indicator light on said SCSI card indicative of the data access state of said at least one hard disk.

4. The hard disk driver state detection method of claim 1 wherein when said SCSI card receives data of said at least one hard disk from said 12C circuit of said SCSI bus and SCA2, a fan detection circuit, a voltage detection circuit and a temperature detection circuit of said SCSI card detect the state of a fan, voltage and temperature of said SCSI card, enabling detection data to be sent by a controller of said computer system detection main unit to a CPU (central processing unit) of said computer system detection main unit for display through a monitor for reference.

5. The hard disk driver state detection method of claim 1 wherein when said SCSI card receives data of said at least one hard disk from said 12C circuit of said SCSI bus and SCA2, a voltage level converting circuit of said SCSI card detects the voltage level of said at least one hard disk, enabling detection data to be sent by a controller of said computer system detection main unit to a CPU (central processing unit) of said computer system detection main unit for display through a monitor for reference.

6. The hard disk driver state detection method of claim 1 wherein when the message of said at least one hard disk is received through said 12C circuit of said SCSI bus of said SCSI card, said computer system detection main unit judges a fault/normal state of said at least one hard disk, and keeps running the detection procedure if said at least one hard disk is normal.

7. The hard disk driver state detection method of claim 6 wherein when said at least one hard disk is Judged in the fault state, said computer system detection main unit sends a control signal to a second processor on said SCSI card through said 12C circuit of said SCSI bus, causing said second processor to turn on a corresponding indicator light on said SCSI card indicative of the fault state of said at least one hard disk.

* * * * *